Patented Dec. 27, 1932

1,892,019

UNITED STATES PATENT OFFICE

ARTHUR STOLL AND ERNST BURCKHARDT, OF BASEL, SWITZERLAND, ASSIGNORS TO FIRM OF CHEMICAL WORKS FORMERLY SANDOZ, OF BASEL, SWITZERLAND

MANUFACTURE OF EASILY SOLUBLE BENZYLMORPHINE SALTS

No Drawing. Application filed May 10, 1930, Serial No. 451,504, and in Germany May 24, 1929.

It is known that benzylmorphine hydrochloride (peronine) which has been introduced by Merck for therapeutical purposes, does not possess a sufficient solubility in water (1:133). In relation to this Merck says in the "Archiv der Pharmazie", 237, page 219 (1899) that: "The general introduction of it is rendered difficult by its insufficient solubility and the burning taste." It is further known that benzylmorphine yields, with organic acids, easily soluble, but amorphous salts (E. Merck, German Patent 91,813; Archiv der Pharmazie 237, page 219 (1899)).

It has now been found that hitherto unknown easily soluble and crystallized stable salts of benzylmorphine can be prepared by combining benzylmorphine with alkylsulphonic acids of low molecular weight, for example with methane or ethane sulphonic acids.

The process is based on the formation of salts between benzylmorphine and the alkylsulphonic acids and may be carried out by interaction of the free base and the free acids or by double decomposition of their suitable salts. The new compounds obtained in this manner can easily be crystallized and are stable even in aqueous solutions. They possess the following chemical composition:

$C_{17}H_{18}NO_3(CH_2C_6H_5)C_nH_{2n+1}SO_3H$, e. g.
$C_{17}H_{18}NO_3(CH_2C_6H_5).CH_3SO_3H$ or
$C_{17}H_{18}NO_3.(CH_2C_6H_5)C_2H_5SO_3H$, which contain 79.6 to 77.3 per cent of benzylmorphine base and comply with all requirements which are desired for therapeutical use, especially for injection purposes, with respect to their solubility, their stability and to the reaction of their aqueous solutions.

The following examples illustrate the invention:

Example 1

100 parts of benzylmorphine base are dissolved by gentle heating in 250 parts of methanol and treated with the theoretical quantity (256 ccm.) of a 10% solution of methane sulphonic acid in methanol.

From the cold solution thus obtained and after a short time the methane sulphonic salt of benzylmorphine crystallizes out in form of fine, well formed, on both sides pointed leaflets, which are generally grown together. On addition of dried ether the crystallization becomes nearly quantitative.

One part of the obtained compound is soluble in less than one part of water at 20° C. and yields a neutral solution on litmus. One part of the salt is soluble in about 10 parts of alcohol, but practically insoluble in ether.

By slow heating it melts at 207–208° C. becoming colored brown.

Its analysis gave the following results:
0.2653 g. of salt: 5.74 cc. $N/10 H_2SO_4$ Kjeldahl.

7.435 mg. of salt: 3.385 mg. $BaSO_4$ microanalysis.

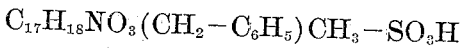

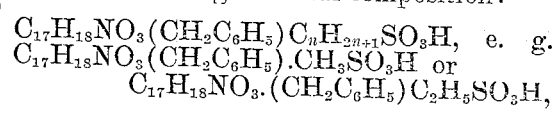

The methane sulphonic salt of benzylmorphine, when dissolved in molybdenum-sulphuric acid, yields a characteristic violet coloration. The molybdenum-sulphuric acid is a well known reagent prepared by dissolving 0.5 g. of ammonium molybdate in 195 g. of concentrated sulphuric acid. This reagent yields with some alkaloids blue to violet colorations and is often used for their detection.

Example 2

100 parts of benzylmorphine are dissolved in the theoretical quantity of diluted sulphuric acid and treated with a concentrated aqueous solution of 44 parts of the barium salt of methane sulphonic acid. The obtained solution is filtered from the barium sulphate and concentrated in vacuo. The crystallized methane sulphonic salt of benzylmorphine obtained from the concentrated solution possesses the same properties as the compound prepared according to the Example 1.

Example 3

100 parts of benzylmorphine are dissolved in 300 parts of absolute alcohol and treated with 100 parts of a 30 per cent alcoholic solution ethane sulphonic acid. By diluting the obtained solution with dry ether, the ethane sulphonic salt of benzylmorphine precipitates in form of small crystals. By concentrating the solution the remaining part of the compound may be isolated. One part thereof is soluble in 0.7 parts of water at 20° C., yielding a neutral solution. By slow heating at 190° C. the compound becomes colored and melts at 201–202° C. yielding a brown coloration.

On the analysis the following results have been obtained:

0.2192 g. of salt: 4.39 cc. N/10H$_2$SO$_4$ Kjeldahl.

7.110 mg. of salt: 3.352 mg. BaSO$_4$ microanalysis.

$$C_{17}H_{18}NO_3(CH_2-C_6H_5) C_2H_5SO_3H$$

|  | Per cent | Per cent |
|---|---|---|
| Calculated | N: 2.88 | S: 6.61 |
| Found | N: 2.81 | S: 6.48 |

The ethane sulphonic acid of benzylmorphine gives the same reaction as benzylmorphine itself.

Similar easily soluble compounds are obtained by using propane or isopropane sulphonic acids.

What we claim is:

1. A process for the preparation of new stable crystallized and easily water soluble salts of benzylmorphine, consisting in treating benzylmorphine in a solvent with an alkylsulphonic acid containing not more than 5 carbon-atoms.

2. A process for the preparation of new stable crystallized and easily water soluble salts of benzylmorphine, consisting in treating benzylmorphine in a solvent with an alkylsulphonic acid which does not contain more than 5 carbon-atoms.

3. A process for the preparation of a new stable, crystallized and easily water soluble salt of benzylmorphine, consisting in treating a methanol solution of benzylmorphine with methane sulphonic acid.

4. The new crystallized alkylsulphonic salts of benzylmorphine which are white compounds, easily soluble in water, yielding stable and neutral solutions and giving with molybdenum-sulphuric acid reagent a violet coloration.

5. The methane sulphonic salt of benzylmorphine, which is a white crystallized compound, melting at 207–208° C., being easily soluble in water, yielding stable and neutral solutions and giving with molybdenum-sulphuric acid reagent a violet coloration.

In witness whereof we have hereunto signed our names this 30th day of April, 1930.

ARTHUR STOLL.
ERNST BURCKHARDT.